Patented Mar. 17, 1942

2,276,460

UNITED STATES PATENT OFFICE 2,276,460

MAKING CELLULOSE ETHERS

Edgar C. Britton and Walter J. Le Fevre, Midland, Mich., assignors to The Dow Chemical Company, Midland, Mich., a corporation of Michigan No Drawing. Application September 23, 1939, Serial No. 296,223

8 Claims. (Cl. 260—231)

This invention relates to the manufacture of cellulose ethers, and especially to processes for etherifying alkali cellulose with alkyl halides.

In the previously known and described processes for the manufacture of cellulose ethers, involving the reaction between an alkali cellulose and an alkyl halide, the time required to produce the desired ether product has always been excessive and the reaction has been characterized by an excessive consumption of alkali and of alkyl halide with the accompanying formation of such undesirable by-products as alcohols and alkyl ethers. In said prior methods for the alkylation of alkali cellulose, it has been customary to maintain the alkali:cellulose ratio and the water:cellulose ratio as small as possible to effect whatever economy is possible in reagents. Even so, the amount of alkali required has always been found to be far more than that equivalent to the degree of ethylation obtained. In all such processes, it has been customary to continue the reaction for periods of time ranging from about 8 to 24 hours or longer, on the assumption that such continued heating is essential to the preparation of useful cellulose ether products. It has been stated that the cellulose ether produced in the early stages of the reaction, i. e. with a reaction time shorter than approximately 8 hours, is not adapted to commercial applications, as it has been described as containing excessive quantities of fibrous materials, gels, etc.

An object of this invention is to provide a process for the manufacture of cellulose ethers by the interaction of alkali cellulose and alkyl halides without consuming substantially more of the alkyl halide or of the alkali present than is required to produce an ether having the desired alkoxyl content. A particular object of the invention is to provide a method for the etherification of alkali cellulose wherein excess alkyl halide or excess sodium hydroxide, or both, can be recovered when the desired degree of etherification has been attained instead of being consumed in the formation of undesired by-products.

In the reaction between alkali cellulose and ethyl chloride, we have found that when a substantial excess of alkali over the amount required to form a soda-cellulose of the approximate formula $C_6H_{10}O_5 \cdot 3NaOH$, and a substantial excess of ethyl chloride over the amount required to react with the sodium hydroxide present are employed, ethylation occurs rapidly at a reaction temperature between about 90° and about 150° C., and the ethoxyl content of the cellulosic material in the reactor increases to a maximum in about 1.5 to about 5 hours. The ethylation is complete at this point. If per cent ethoxyl in the ethyl cellulose is plotted against reaction time, the time rate of change of ethoxyl, from this point on, is substantially zero, i. e. the curve becomes and remains parallel to the time axis. Thereafter no material change in the ethoxyl content of the cellulose ether is produced, even though heating be continued for a long time. The amount of ethyl chloride and the alkalinity of the contents of the reactor continue to decrease, however, due to continued reaction between the ethyl chloride and excess alkali present. At the 1.5 to 5 hour stage in the reaction, when maximum ethoxyl content of cellulose ether has been obtained, the etherified cellulose contains small amounts of substances generally referred to as gels, which do not dissolve in the usual solvents for cellulose ethers. When the reaction is continued in the presence of ethyl chloride and sodium hydroxide until the total reaction time is in the range from 8 to 12 hours or more, a substantially completely soluble ethyl cellulose is obtained. This product has no higher ethoxyl content, however, than the crude material after a reaction time of only 1.5 to 5 hours, so that the formation of such completely soluble product is accompanied by destruction of valuable materials.

It is well known that the maximum degree of etherification obtainable is dependent upon the alkali:cellulose and the water:cellulose ratios, and is a constant for any given combination of said ratios, the reaction being carried out under approximately uniform conditions of time and temperature. The maximum etherification possible under a given set of conditions having once been determined, it may be employed for reference in the selection of that set of conditions which will result in the formation of any desired type of ether product.

Following our discovery that the etherification reaction proper is complete within a relatively short time, ordinarily within about 1.5 to 5 hours, we have further found that the product recoverable after said short reaction period, which is somewhat non-uniform in composition, although having the desired average degree of etherification, may be made uniformly solvent-soluble by means of an after-treatment consisting in heating the said non-uniform product in a manner and under conditions to be more fully described hereinafter.

Our invention, then, consists in heating an alkali cellulose with an excess of an alkyl halide at a reaction temperature ordinarily in the range from about 90° to about 150° C. until the maximum degree of etherification under reaction conditions is attained, thereupon immediately discontinuing the reaction and separating from the cellulose ether product the remainder of one of the reagents essential to etherification, i. e. sodium hydroxide or alkyl halide, thereafter heating the cellulose ether under temperature conditions similar to those employed in the etherification, in a menstruum free from at least one of the mutually destructive reagents, sodium hydroxide and alkyl halide, and at a pH above about 5.5, but which otherwise simulates the liquid medium wherein cellulose is ordinarily etherified, and continuing the heating for from 3 to 8 hours, until the total time at reaction temperature in the etherification and in the after-treatment is from 8 to 12 hours, thereby to produce uniformly substituted solvent-soluble alkyl ethers of cellulose. No catalyst or accelerator is required in the main etherification reaction, the etherification taking place solely through the interaction of alkali cellulose and an alkyl halide.

In a preferred method of carrying out our invention, an alkali cellulose of satisfactory grade for the production of ethyl cellulose is mixed with ethyl chloride in an amount substantially in excess over that required to produce the desired type of ethyl cellulose. The mixture is heated in a closed vessel to a temperature in the range from about 90° to about 150° C. and at a corresponding pressure of approximately 200 to 250 pounds gauge until the maximum degree of ethylation has occurred, which is ordinarily in a period not greater than 5 hours. The temperature of reaction and the length of time required to arrive at the desired alkoxyl content vary with the alkylating agent employed, but in general a reaction temperature can be found within the acceptable range below 150° C. such that the etherification has reached its maximum value within from 1.5 to 5 hours. The reactor is then cooled immediately to about room temperature, but not below the boiling point of ethyl chloride, and a vapor outlet is opened, permitting the unreacted ethyl chloride to pass off as a vapor into a suitable condensing system. The balance of the reaction mixture, consisting essentially of cellulose ether, water, alkali, salt, and traces of alcohol and ethyl ether, is treated with a solvent capable of dissolving the cellulose ether, when in uniformly substituted condition. The reaction vessel is closed and again heated to a temperature in the range from about 90° to 150° C. for from 3 to 8 hours or at least until the total time at reaction temperature in the etherification and in the after-treatment is from 8 to 12 hours, the pH of the mixture at all times being above about 5.5. The reaction mixture is again cooled, volatile solvent is then removed in known manner, and the cellulose ether is washed free from salt, alkali, and other water-soluble ingredients. The so-treated cellulose ether is found to be uniformly substituted and to have as high solubility both in single solvents and in mixed solvents as do the cellulose ethers prepared in the heretofore customary manner. The method has the advantage over previously known methods of providing a means whereby excess alkyl halide may be present in the initial reaction without being converted unnecessarily to by-product.

The following examples illustrate the practice of our invention:

*Example 1*

600 grams of alkali cellulose having an alkali: cellulose ratio of 2.25 and a water : cellulose ratio of 2.0 was treated with 1850 grams of ethyl chloride at a temperature of 120° C. for 3 hours, at the end of which time the ethoxyl content was in the range desired, viz. 41.1 per cent. The reaction vessel was cooled and the excess ethyl chloride was thereupon immediately vented from the reactor into a suitable condensing system and recovered. The balance of the reaction mixture was agitated to insure uniformity and a sample was removed for testing. When the ethyl cellulose in the sample was washed free from sodium hydroxide and sodium chloride, it was found to be satisfactory for molding purposes but not to have a complete solubility in the usual solvents for cellulose ethers. To the main portion of the reaction mixture in the etherifying vessel was added 500 grams of benzene, 75 grams of alcohol, and 25 grams of ethyl ether, the benzene to serve as a solvent for the cellulose ether and the alcohol and ethyl ether being added to simulate as nearly as possible the conditions existing in the heretofore usual etherification reaction, without any ethyl chloride being present. The so-formed mixture was heated at 120° C. for about 6 hours, when the reactor was cooled and the contents were discharged into a large body of hot water, whereby the volatile solvent media were flash evaporated and the ethyl cellulose was precipitated. The alkaline liquor was separated from the precipitate by filtration, and after recovery of salt therefrom by crystallization was adapted for reuse in the preparation of alkali cellulose. The ethyl cellulose resulting from the treatment above described was substantially completely soluble in the common single and mixed solvents for cellulose ethers showing that the material had been converted from a non-uniformly substituted, partially solvent-soluble material to a uniformly substituted completely soluble product.

*Example 2*

An ethyl cellulose was prepared by interaction of alkali cellulose and ethyl chloride at 120° C., only until maximum etherification was obtained. The cellulose ether was isolated and found to be very non-uniform in its substitution, as evidenced by solubility characteristics when tested with various single and mixed solvents. This non-uniform product was further treated in accordance with the invention, by heating for 4 hours at 120° C. in a medium free from ethyl chloride, but otherwise like that in which etherification occurs. The mixture heated in the after-treatment consisted of a slurry of the following ingredients in twice their combined weight of benzene.

|   | Per cent by weight |
|---|---|
| Ethyl cellulose (non-uniform) | 18 |
| Sodium chloride | 25.7 |
| Sodium hydroxide | 12.2 |
| Water | 36.3 |
| Ethanol | 3.8 |
| Ethyl ether | 4.0 |

After the solubilizing treatment, the ethyl cellulose was isolated, and found to be uniformly substituted, soluble in organic solvents, and of 48–49 per cent ethoxyl content.

The method has been illustrated with reference to ethyl cellulose, but it may be applied equally to the preparation of the lower alkyl ethers of cellulose in general, i. e. those ethers wherein the substituent groups contain from 1 to 5 carbon atoms.

In similar manner, using alkali cellulose having other alkali and water ratios than the one shown in the examples, ethyl cellulose of other degrees of substitution may be prepared with like economy of reagents, care being taken to carry out the etherification reaction only until the maximum degree of etherification is first attained. After this stage has been reached, one of the etherifying reagents, sodium hydroxide and alkyl halide, is separated from the reaction vessel in a suitable manner. While the examples illustrate the practice of the invention involving the separation of ethyl chloride and the carrying out of the after-treatment in a strongly alkaline medium, it is to be understood that the after-treatment can be effected in a medium consisting of or comprising ethyl chloride, ethyl ether, ethyl alcohol, water, and possibly benzene or other solvent for the ethyl cellulose, provided that the pH of the reaction mixture is kept at all times above 5.5, suitably by addition of sodium bicarbonate or like neutralizing or buffering agent which is relatively unreactive with the alkyl halide. Owing to the acid nature of ethyl chloride in aqueous medium, the viscosity characteristics of the cellulose ether are materially altered unless the after-treatment is at a pH above 5.5. We prefer the mode of preparation described in the examples, wherein the after-treatment is conducted in an alkaline medium and in the absence of alkyl halide.

Since the etherifying step, when conducted according to the mode herein described, does not result in the formation of any appreciable amount of alcohol and/or ether, we have found it desirable on occasion to add small amounts of one or both of these materials to the reaction vessel prior to the solubilizing step of the after-treatment.

The herein described method has several advantages over those heretofore proposed. Among them—short etherification period, minimum by-product formation; recovery of alkyl halide not actually required for etherification; recovery of alkali not actually required for etherification even though large excess of alkali be employed to make a thoroughly impregnated alkali cellulose; and, uniformity of ether product as evidenced by solubility.

This application is a continuation-in-part of our co-pending application Serial No. 129,083, filed March 4, 1937.

Other modes of applying the principle of our invention may be employed instead of those explained, change being made as regards the method herein disclosed, provided the steps or steps stated by any of the following claims or the equivalent of such stated step or steps be employed.

We therefore particularly point out and distinctly claim as our invention:

1. A method of producing uniformly substituted solvent-soluble lower alkyl ethers of cellulose wherein the alkyl groups contain from 1 to 5 carbon atoms, which comprises forming an alkali cellulose containing an excess of sodium hydroxide over that represented by the formula $C_6H_{10}O_5.3NaOH$, adding an excess of a lower alkyl halide over the total sodium hydroxide present, heating the mixture for from 1.5 to 5 hours, to effect etherification solely through interaction of the alkali, cellular and alkyl halide, at a temperature between about 90° and about 150° C. only until the maximum degree of etherification under reaction conditions is attained, thereupon immediately terminating the reaction, thereafter separating the unreacted excess of only one of the reagents above-stated to be originally present in excess, leaving a residual mixture having a pH above 5.5 and containing the non-uniformly substituted cellulose ether, heating such residual mixture while maintaining therein a pH above 5.5 for from 3 to 8 hours at a temperature between 90° and 150° C. in contact with a solvent capable of dissolving the cellulose ether when the latter is uniformly substituted, until the total time at reaction temperature in the etherification and in the after-treatment is from 8 to 12 hours, and separating the uniformly substituted cellulose ether from the so-treated mixture.

2. A method of producing uniformly substituted solvent-soluble lower alkyl ethers of cellulose wherein the alkyl groups contain from 1 to 5 carbon atoms, which comprises forming an alkali cellulose containing an excess of sodium hydroxide over that represented by the formula $C_6H_{10}O_5.3NaOH$, adding an excess of a lower alkyl halide over the total sodium hydroxide present, heating the mixture for from 1.5 to 5 hours, to effect etherification solely through interaction of the alkali, cellulose and alkyl halide, at a temperature between about 90° and about 150° C. only until the maximum degree of etherification under reaction conditions is attained, thereupon immediately terminating the reaction, thereafter separating only the unreacted excess of lower alkyl halide, leaving a residual mixture having a pH above 5.5 and containing the non-uniformly substituted cellulose ether, heating such residual mixture for from 3 to 8 hours at a temperature between 90° and 150° C. in contact with a solvent capable of dissolving the cellulose ether when the latter is uniformly substituted, until the total time at reaction temperature in the etherification and in the after-treatment is from 8 to 12 hours, and separating the uniformly substituted cellulose ether from the so-treated mixture.

3. A method of producing uniformly substituted solvent-soluble lower alkyl ethers of cellulose wherein the alkyl groups contain from 1 to 5 carbon atoms, which comprises forming an alkali cellulose containing an excess of sodium hydroxide over that represented by the formula $C_6H_{10}O_5.3NaOH$, adding an excess of a lower alkyl halide over the total sodium hydroxide present, heating the mixture for from 1.5 to 5 hours, to effect etherification solely through interaction of the alkali, cellulose and alkyl halide, at a temperature between about 90° and about 150° C. only until the maximum degree of etherification under reaction conditions is attained, thereupon immediately terminating the reaction, thereafter separating only the unreacted excess of alkali, leaving a residual mixture having a pH above 5.5 and containing the non-uniformly substituted cellulose ether, heating such residual mixture while maintaining therein a pH above 5.5 for from 3 to 8 hours at a temperature between 90° and 150° C. in contact with a solvent capable of dissolving the cellulose ether when the latter is uniformly substituted, until the total time at reaction temperature in the etherification and in the after-treatment is from 8 to 12 hours, and separating the uniformly substituted cellulose ether from the so-treated mixture.

4. A method of producing uniformly substituted solvent-soluble lower alkyl ethers of cellulose wherein the alkyl groups contain from 1 to 5 carbon atoms, which comprises forming an alkali cellulose containing an excess of sodium hydroxide over that represented by the formula $C_6H_{10}O_5.3NaOH$, adding an excess of a lower alkyl halide over the total sodium hydroxide present, heating the mixture for from 1.5 to 5 hours, to effect etherification solely through interaction of the alkali, cellulose and alkyl halide, at a temperature between about 90° and about 150° C. only until the maximum degree of etherification under reaction conditions is attained, thereupon immediately terminating the reaction, thereafter separating the unreacted excess of only one of the reagents above-stated to be originally present in excess, leaving a residual mixture having a pH above 5.5 and containing the non-uniformly substituted cellulose ether, heating such residual mixture while maintaining therein a pH above 5.5 for from 3 to 8 hours at a temperature between 90° and 150° C. in contact with benzene, until the total time at reaction temperature in the etherification and in the after-treatment is from 8 to 12 hours, and separating the uniformly substituted cellulose ether from the so-treated mixture.

5. The method as claimed in claim 1, wherein the lower alkyl halide is ethyl chloride and the cellulose ether is ethyl cellulose.

6. The method as claimed in claim 2, wherein the lower alkyl halide is ethyl chloride and the cellulose ether is ethyl cellulose.

7. The method as claimed in claim 3, wherein the lower alkyl halide is ethyl chloride and the cellulose ether is ethyl cellulose.

8. The method as claimed in claim 4, wherein the lower alkyl halide is ethyl chloride and the cellulose ether is ethyl cellulose.

WALTER J. LE FEVRE.
EDGAR C. BRITTON.